(12) United States Patent
Standlee

(10) Patent No.: US 9,655,421 B2
(45) Date of Patent: May 23, 2017

(54) APPARATUS FOR COMPUTER PERIPHERAL STORAGE

(71) Applicant: Courtney Standlee, New Orleans, LA (US)

(72) Inventor: Courtney Standlee, New Orleans, LA (US)

( * ) Notice: Subject to any disclaimer, the term of this patent is extended or adjusted under 35 U.S.C. 154(b) by 62 days.

(21) Appl. No.: 14/701,896

(22) Filed: May 1, 2015

(65) Prior Publication Data

US 2016/0316871 A1    Nov. 3, 2016

(51) Int. Cl.
  *B65D 85/00*    (2006.01)
  *A45C 11/00*    (2006.01)
  *F16M 13/02*    (2006.01)
  *G06F 1/16*    (2006.01)

(52) U.S. Cl.
  CPC ........... *A45C 11/00* (2013.01); *F16M 13/022* (2013.01); *G06F 1/1626* (2013.01); *A45C 2011/002* (2013.01)

(58) Field of Classification Search
  CPC ...... B65D 33/14; F16M 13/022; A45C 11/00; A45C 2011/002; G06F 1/1626
  USPC ....... 206/320, 453, 576, 279, 477, 216, 223, 206/701, 579, 720, 722; 383/22; 248/682
  See application file for complete search history.

(56) References Cited

U.S. PATENT DOCUMENTS

| | | | | |
|---|---|---|---|---|
| 5,326,175 A | * | 7/1994 | Carter | A01D 75/008 224/401 |
| 5,779,366 A | * | 7/1998 | McKenzie, III | H05K 5/0247 206/702 |
| 6,097,448 A | * | 8/2000 | Perkins | B60R 11/0229 224/275 |
| 7,248,463 B2 | * | 7/2007 | Bander | G06F 1/1607 361/679.27 |
| 2005/0152621 A1 | * | 7/2005 | Healy | B42F 7/00 383/22 |
| 2007/0035120 A1 | * | 2/2007 | Payne | B42D 3/18 281/31 |
| 2010/0243393 A1 | * | 9/2010 | Mahu | A45C 11/00 190/107 |
| 2011/0226831 A1 | * | 9/2011 | Crifasi | A45C 1/04 224/666 |

* cited by examiner

*Primary Examiner* — Jacob K Ackun
*Assistant Examiner* — Rafael Ortiz
(74) *Attorney, Agent, or Firm* — Zachary Christiansen

(57) ABSTRACT

This invention allows one mobility while having modular components connected to a portable computer. In general it is an apparatus that attaches to the back of a monitor, in order to store and use peripheral components conveniently. In the preferred embodiment, it is comprised of three main pieces, a pouch, two or more corner pieces and two or more hanging supports.

2 Claims, 12 Drawing Sheets

APPARATUS FOR COMPUTER PERIPHERAL STORAGE

CROSS-REFERENCE TO RELATED APPLICATIONS

Not Applicable

STATEMENT REGARDING FEDERALLY FUNDED RESEARCH

Not Applicable

REFERENCE TO A MICROFICHE APPENDIX

Not applicable

BACKGROUND OF THE INVENTION

Field of the Invention/Technical Field

The present invention is in the technical field of containers, more specifically containers attached to computers for storage.

Description of Related Art/Background Art

Currently, computers often have numerous peripheral connections than can be connected to the computer in order to have a working station. These devices may include hard drives, cd-drives zip drives, speakers, scanners, optical drives, phones, cameras, flash memory devices, fingerprint scanners, dongles, keypads, card readers, game controllers etc. When using one or more of these devices, the user will usually set up a place to work, unpack one or more of the peripheral devices, plug them into the ports on the side of the computer and begin working. These devices then will sit next to the computer while the user works. However with portable computers it is often desirable to move the computer whilst the computer remains on, but have the peripheral devices remain attached and plugged in.

Previous attempts at connecting peripherals to a computer include U.S. Pat. No. 5,619,395. This is a device for attaching a wireless telephone to a portable computer. The phone is clipped onto the monitor portion of the portable computer and is a convenient place for the phone, so that the user does not lose it and can monitor calls. The clip design impedes a portion of the viewing screen when the phone is attached to the monitor.

US patent application 2009/0230000 discloses a travel pouch/jewelry holder that rolls up and is capable of storing jewelry. However, the jewelry holder does not have means for attachment to any support mechanism, nor corner pieces which would allow support of the jewelry holder from a computer.

U.S. Pat. No. 8,342,470 contemplates a mechanism for hanging items on a door. It comprises loops that extend around the door edge and hanging supports that connect to a hook. However, corner pieces with the front and back flap sizes (meant to allow full viewing of a screen and hanging supports) connecting to two or more places on a peripheral storage container are not possible with said door hanging device.

GENERAL SUMMARY OF INVENTION

In general, this invention is an apparatus that attaches to a monitor, which allows one to use peripheral components conveniently. It is comprised of three main pieces, a pouch, two or more corner pieces and two or more hanging supports. Ideally is thought that the device is made up of flexible material that would allow one to roll up and store the pouch (and other components). However in other embodiments it may be comprised of a rigid structure and material. It allows mobility and movement of peripheral devices, in tandem with a computer.

It is an object of the invention to allow one to easily store a peripheral holder apparatus on their person without creating bulk.

It is an object of the invention to allow one to move a monitor and protect any attached peripheral devices that may be attached to it.

It is an object of the invention to allow one to have a means to store a device connected to the monitor.

It is an object of the invention to allow one to have a means to accommodate different size peripheral devices.

It is an object of the invention to hold a camera on the back portion of a monitor, so that one may survey what is happening behind them when they are using the computer.

It is an object of the invention to be secured to a computer by a universal locking mechanism.

It is an object of the invention to attach to medical equipment that may have modular components (such as a blood pressure cuff) for use of said equipment.

It is an object of the invention to store personal items such as; wallets, keys, badges, gaming peripherals, phones, digital memory devices, wireless devices, and bluetooth equipped electronic devices.

DETAILED DESCRIPTION OF THE INVENTION

The invention has several sub steps for using it which are as follows: First, a person would open up their laptop or tablet computer (herein termed the Method (1)-Step (1) 501). Next, a person would unveil the apparatus by opening it, unrolling it, or producing it (herein termed the Method (1)-Step (2) 502). Next, a person would insert a peripheral device into the flap aperture 7 of the apparatus, (herein termed the Method (1)-Step (3) 503). Next, a person would close the flap and have preferably have one or more cords extend out of the access aperture 9, (herein termed the Method (1)-Step (4) 504). Next, a person would close the access aperture 9, (herein termed the Method (1)-Step(5) 505). Next, a person would attach the corner pieces of the apparatus to the monitor, (herein termed the Method (1)-Step (6) 506). Last, a person would connect the cords to the computer, (herein termed the Method (1)-Step (7) 507). The aforementioned method is herein termed Method (1) 500. While the steps in Method (1) 500 are depicted in a particular order, the principles of the present disclosure are not limited to the order depicted immediately above. Additionally, embodiments of the Method (1) 500 process can include more or less steps than those depicted.

Figure 1:
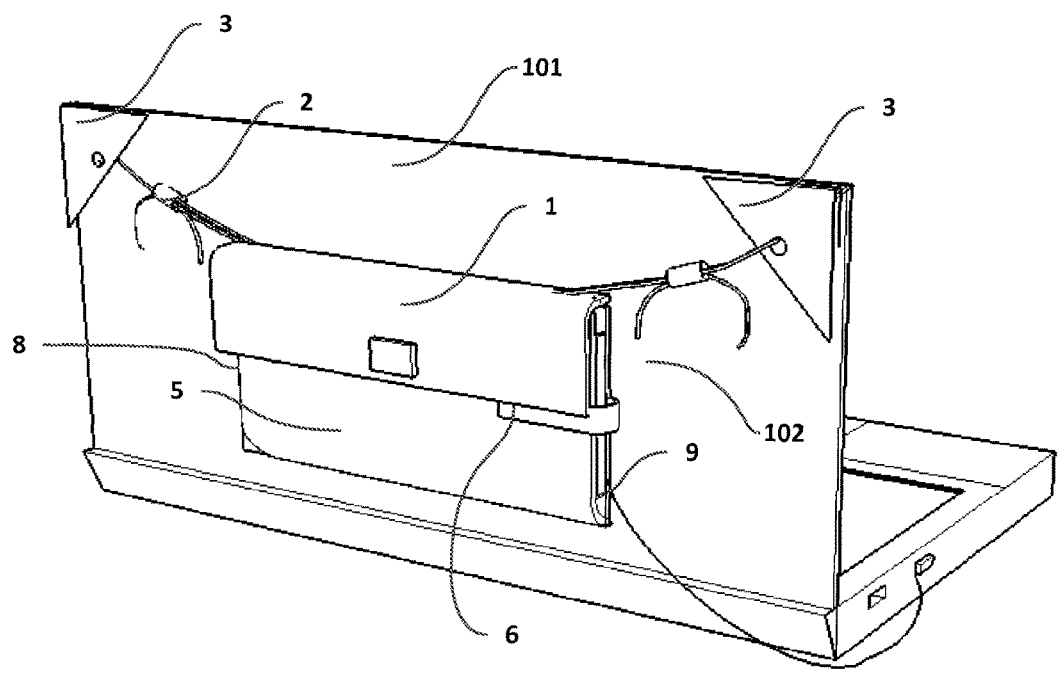
FIG. 1 is a perspective view that shows use of the apparatus and a laptop computer.
Figure 2:
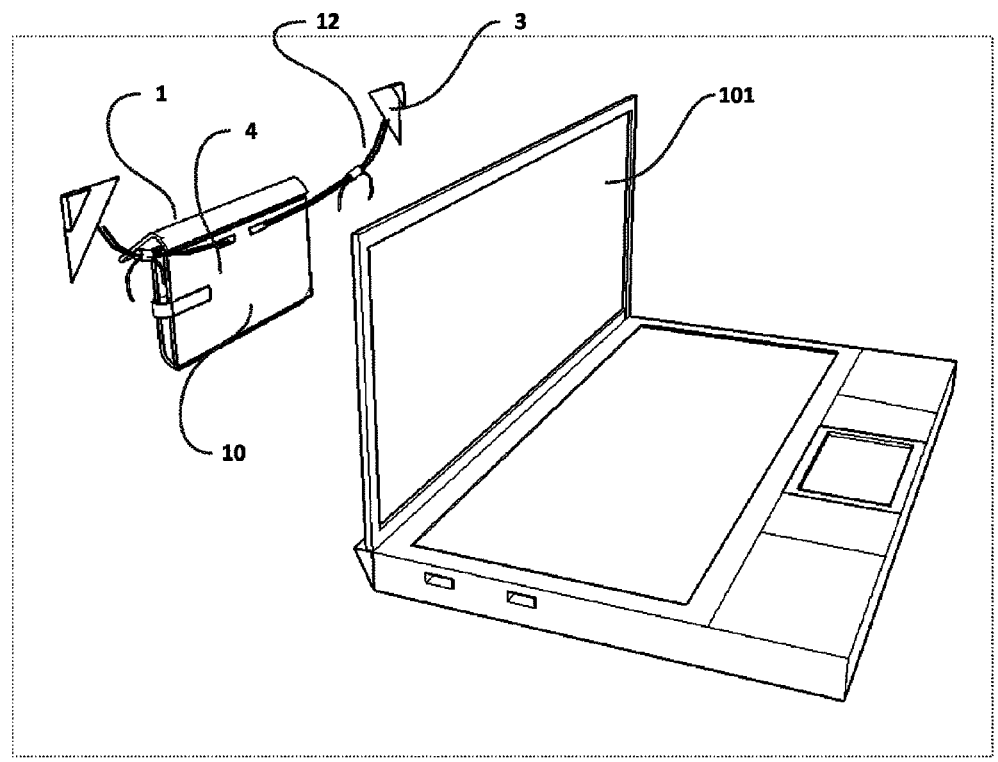
FIG. 2 is a perspective view that shows the apparatus and its removability from the substrate.
Figure 3:
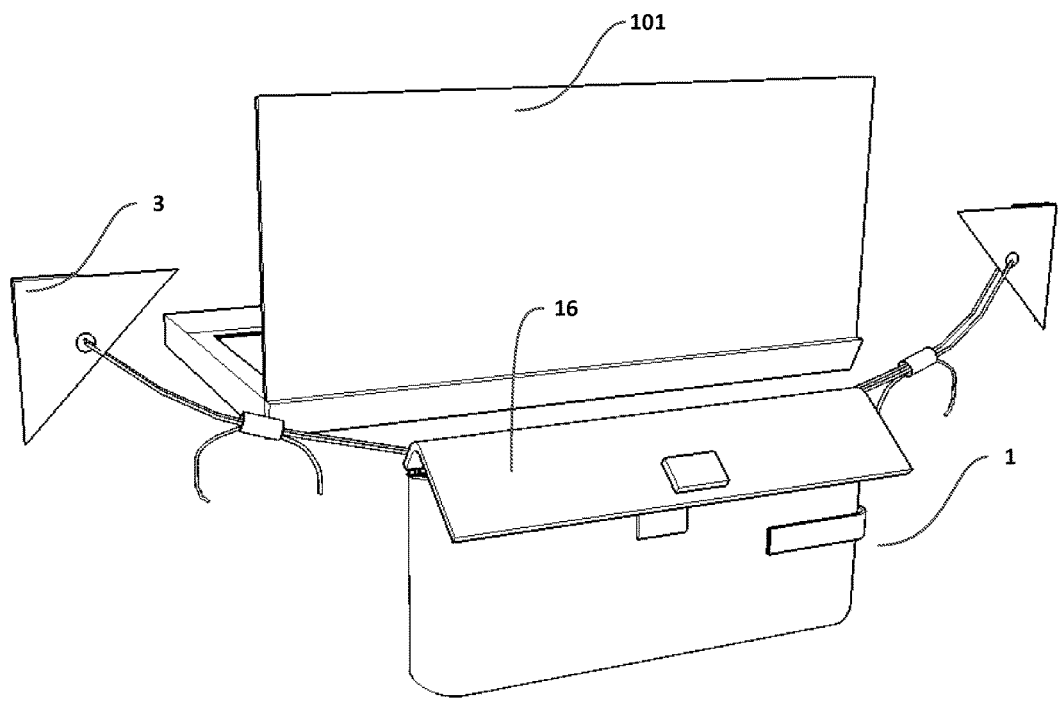
FIG. 3 is a perspective view that shows the openable flap of the apparatus and the corner pieces extended.

Overall, the invention contains one or more peripheral devices 102 and operably attaches to a monitor 101 (or device that incorporate modular electronic components) and has 3 ancillary items (FIG. 1, FIG. 2 and FIG. 3); a pouch 1, two or more hanging supports 2, and two or more corner pieces 3. The pouch 1 preferably comprises a back piece 4, a front piece 5, an aperture closure mechanism 6, a flap aperture 7, a sealed edge 8, and an access aperture 9.

For the operation of this invention, the pouch 1 has several purposes. First, the pouch 1 aims to have a means to store a device connected to the monitor. Additionally, the pouch 1 allows the user to accommodate different size peripheral devices, for attachment to the monitor. Additionally, the pouch 1 is designed to roll up or change it's interior volume (when not accommodating a peripheral device) for travel. It is primarily shaped as a rectangle, but also may be circular of triangular. In alternative embodiments, the pouch 1 may be leather, plastic, hard plastic, velvet, cloth, denim, pliable material, durable paper, grippable, soft material, knit, woven lattice, or parafilm. In the preferred embodiment, the pouch 1 would be composed of rubber.

The back piece 4 of the pouch (FIG. 2 and FIG. 8) rests adjacent to the back of the monitor and preferably comprises multiple important features including; the back outside surface 10, the back inside surface 11 (adjacent to the peripheral device), two or more hanging support connections 12, a hanging support connection inside length 13 (a measurement distance), a hanging support connection outside length 14 (a measurement distance), a hanging support connection top length 15 (a measurement distance), and the flap region 16.

The back piece 4 houses the hanging support connection 12 for attachment to the hanging support 2 and also includes a flap region 16. Additionally, the back piece 4 may have means for closing the access aperture 9.

In order to accommodate multiple types of peripheral devices, the back piece 4 should have a height of 10 inches, but in some cases it is thought that the height be from 4 inches to 36 inches (in the case of large screens). Further, the back piece 4 width is preferably 8 inches, but in other instances the back piece 4 width may also range from 4 to 36 inches as well.

Figure 10:
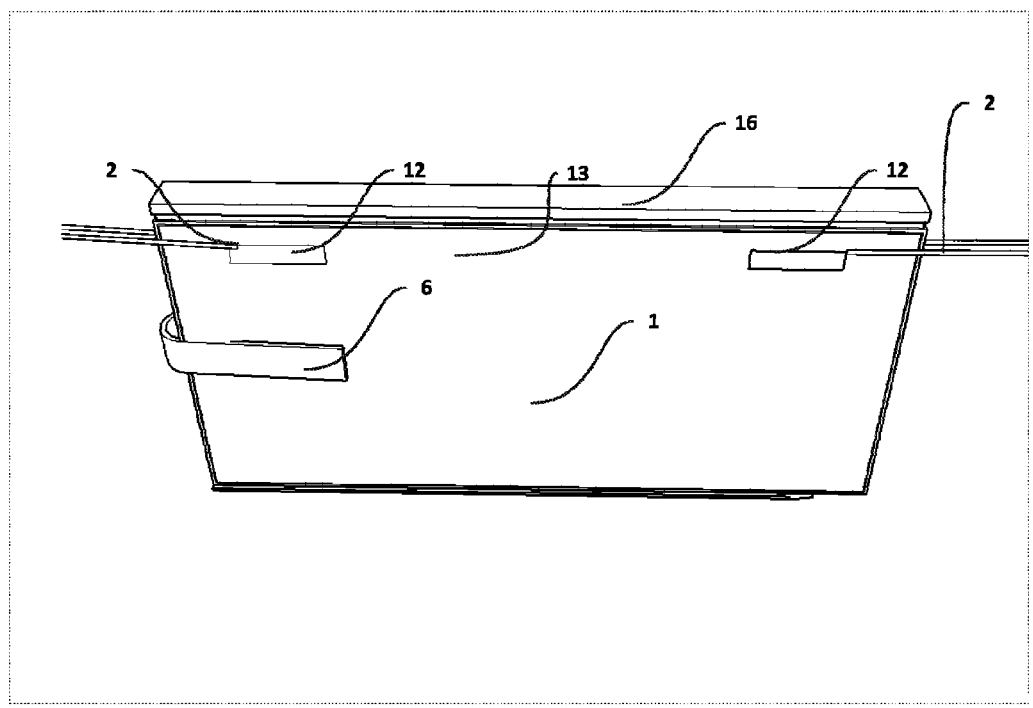
FIG. 10 is a perspective view that shows attachment of the hanging support connection to the hanging support.
Figure 11:
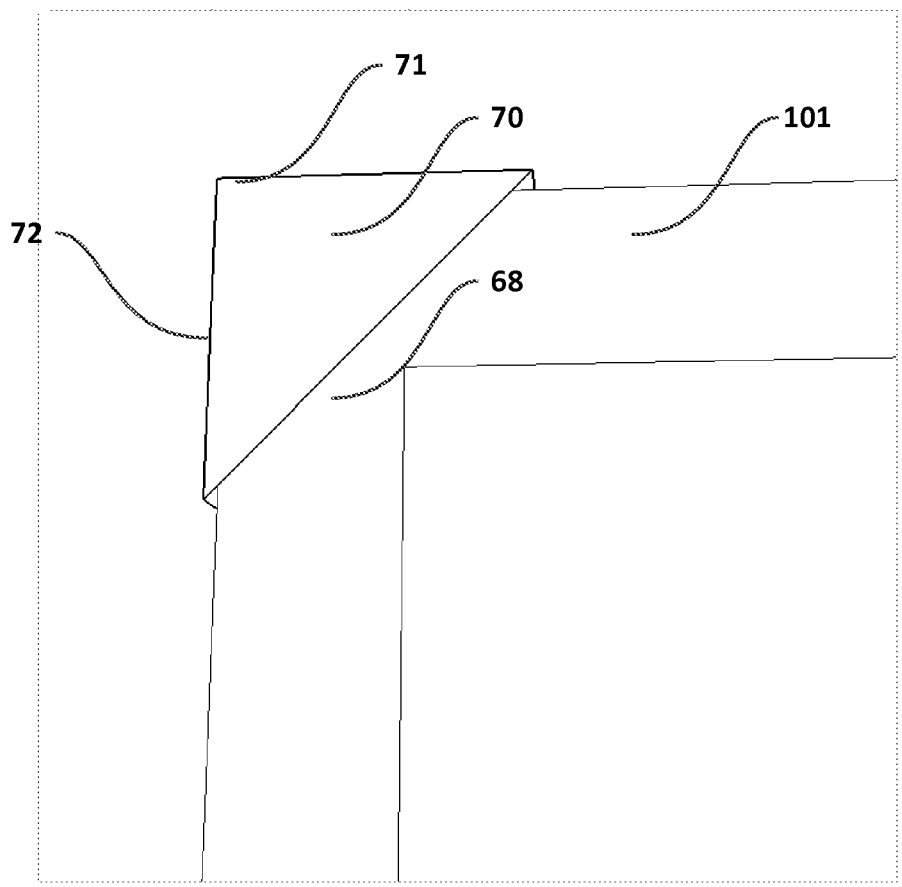
FIG. 11 is a perspective view that shows the corner piece operably attached to a monitor, where it does not impede the screen.
Figure 12:
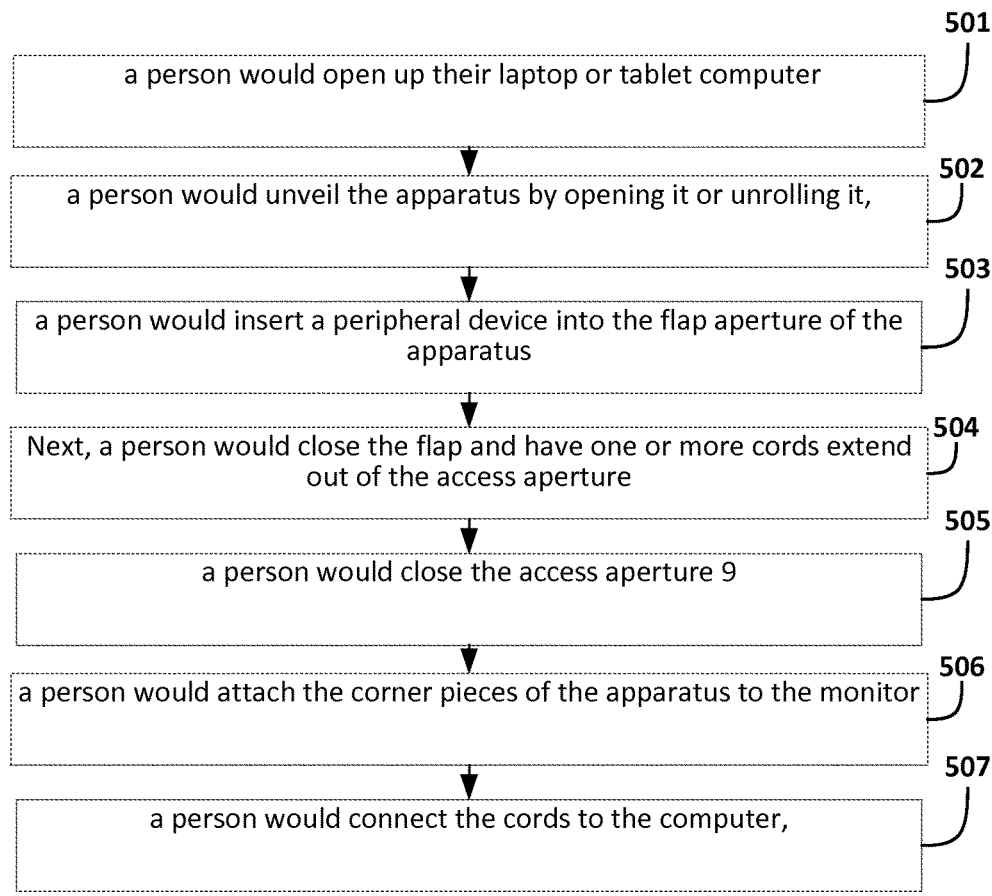
FIG. 12 is a diagram showing the steps of the use of the invention.

The back piece has two or more hanging support connections 12 found near the top flap edge 43 (FIG. 10) and in some embodiments can be near any edge with one or more to secure the pouch. A hanging support connection 12 functions to both 1) accommodate resizing of the hanging support connection 12 and also to 2) accommodate balancing of uneven loads in order to position the pouch 1 nearer to ports, required for peripheral device function. Some embodiments may use a series of holes 17, a button 18, a clip 19, a clasp 20, a hook 21, a loop 22, a grommet 23, a buckle 24, a sliding rail 25, or a knot 26 instead of an instance of the hanging support connection 12.

The (FIG. 8 and FIG. 10) hanging support connection inside length 13 is a measurement distance between the two support connections. Dependent on the distance of separation of the hanging support connections 12 there will be a variability in the stability of the peripheral device in the pouch, which may cause the pouch to tilt. Thus, preferably, the hanging support connection inside length 13 should have a length of 4 inches, however in the case there is only one support connection, this dimension may not be relevant. It is also contemplated that the hanging support connection inside length 13 may span up to 36 inches in the case of a large pouch and/or monitor.

On the opposing side of the hanging support connection inside length 13, is the hanging support connection outside length 14, another important measurement. It is found between the hanging support connection 12 and the sealed edge 8 or the access aperture 9. For maximum stability it should have a length of 1 inches, but in other instances it is reasonable to contemplate that the length may be zero (in the case that the hanging support connection extend all the way to an edge). Alternatively, for a large pouch, a maximum of 18 inches (or at least half the width of the pouch) is also contemplated for this length.

Another important measurement is the hanging support connection top length 15 length. The hanging support connection top length 15 is positionally situated, between the hanging support connection 12 and the top flap edge 43. It should ideally be a distance that allows enough clearance for the flap to open, but be positioned close enough to the edge in order to prevent the pouch from becoming top heavy. Preferably, this distance is approximately 0.25 inches (but alternatively the hanging support connection top length 15 length may be 0 (such that the hanging support connection abuts the top edge) or for larger pouches, 2 inches (or ¹⁄₁₆th of the front piece height).

The flap region 16 (FIG. 7 and FIG. 8) is attached to the top portion of the back piece 4. It is thought that the shape is rectangular, but in some embodiments may be, curved or sawtooth. This is the general means by which one opens and closes the flap aperture, to insert and remove a peripheral device. It may be made of a flexible material (which may be different from the pouch). In the preferred embodiment, the flap region 16 is mainly thought to be composed of rubber, but alternatively the flap region 16 may also be made of leather, plastic, hard plastic (such when having a fixed dimension for a specific external device), velvet, cloth, denim, pliable material (in order to be able to fold up the pouch with device inside and store), durable paper, grippable (in order to prevent shifting of the pouch when in movement), soft material (pleasing to the touch), knit, woven lattice, or parafilm.

In the preferred embodiment, the flap region 16 height is preferably 2 inches, but in other instances may be zero (if there is no flap) or could be as high as 36 inches for large pouches. Concomitantly, the width of the flap region is preferably 8 inches, same as the back piece width, and similarly may vary as the width of the back piece varies. In some versions of the invention, it is reasonable to contemplate that if the flap region 16 is missing than then pouch would be sealed on three sides and would be accessible by the access aperture 9 only.

Figure 7:
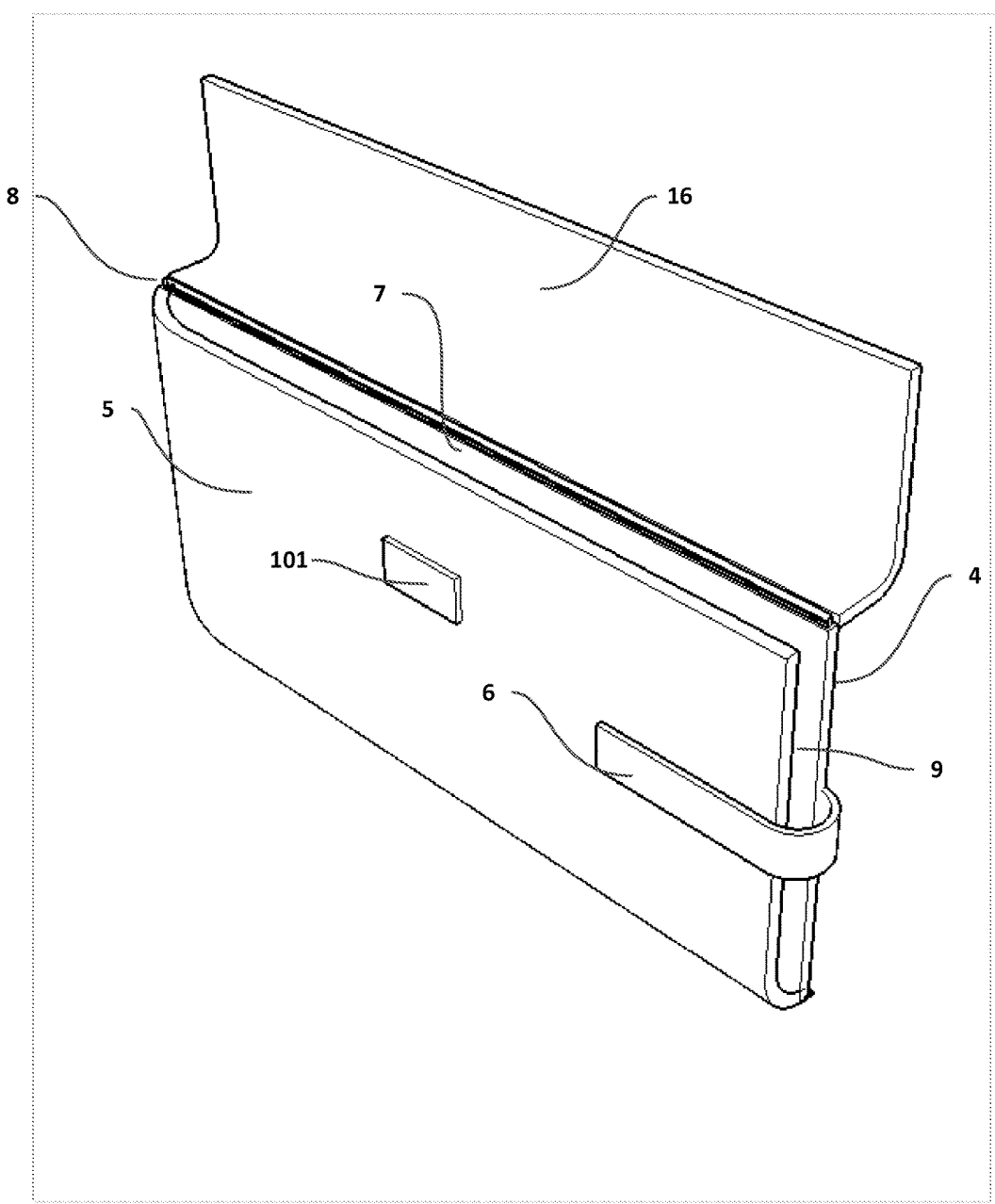
FIG. 7 is a perspective view that shows the top opening of the apparatus and the flap in the extended position.
Figure 8:
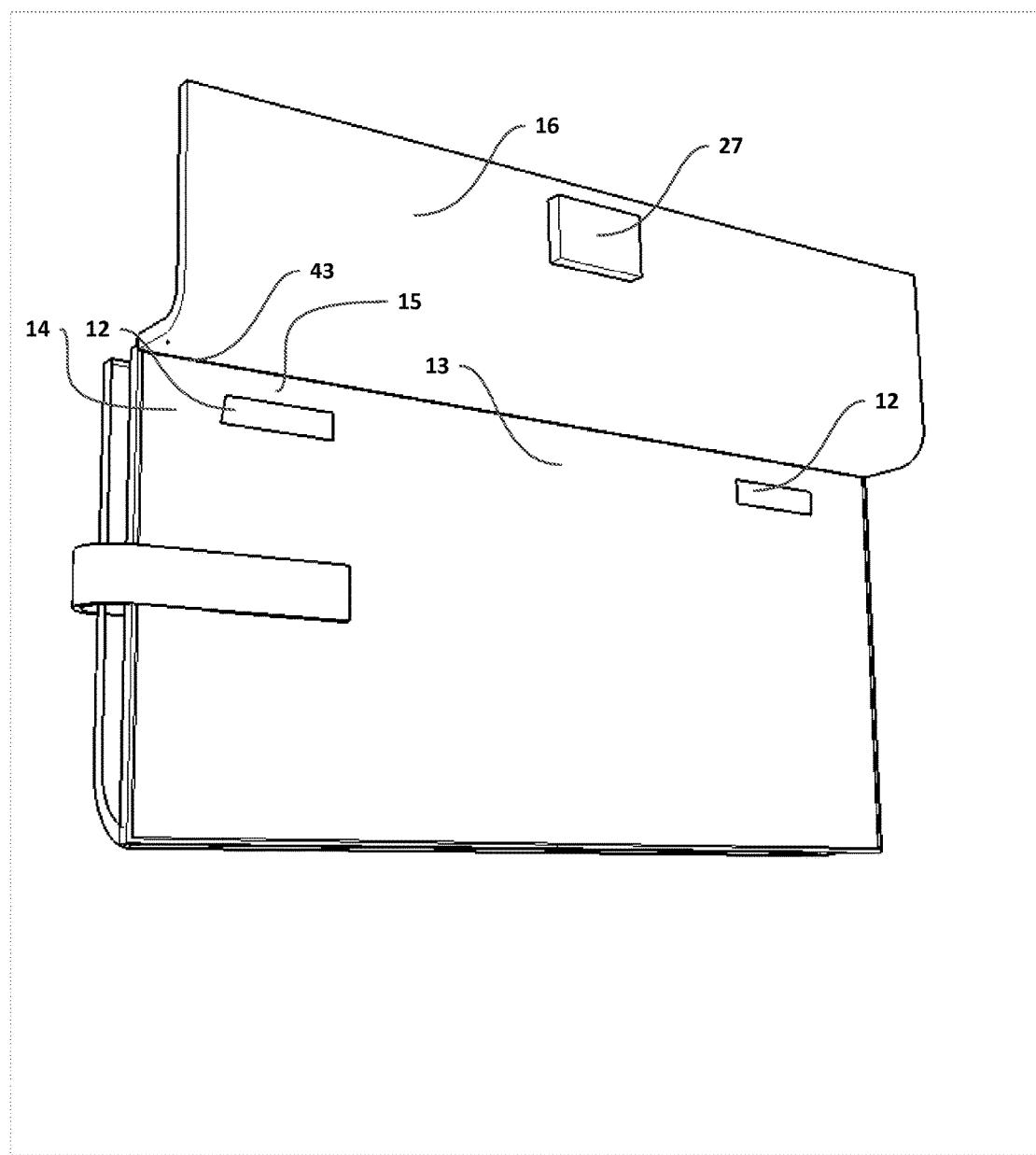
FIG. 8 is a perspective view that shows the positions of the hanging support connection(s) on the back piece.
Figure 9:
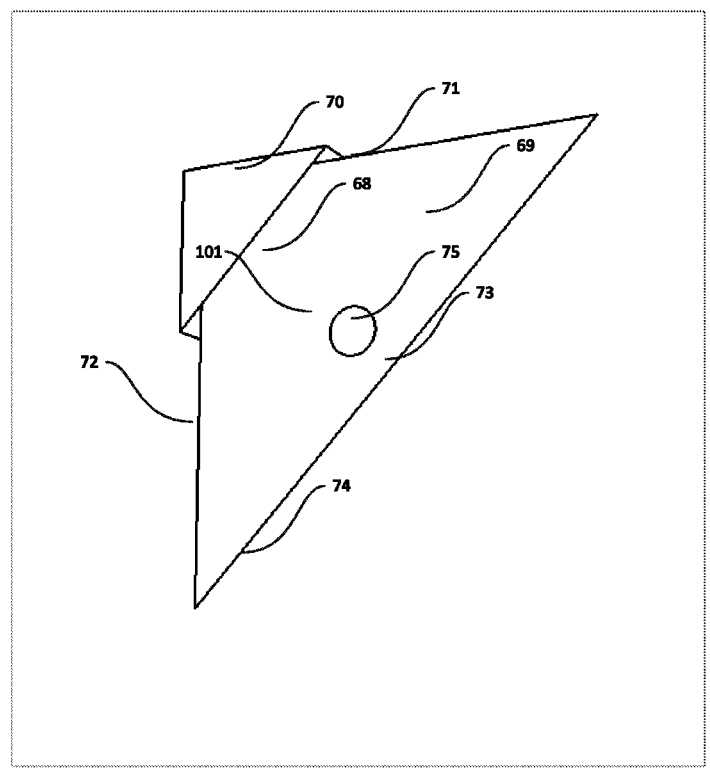
FIG. 9 is a perspective view that shows the functional edges and regions of the corner piece.

In addition, the flap region has a flap closure mechanism (FIG. 7 and FIG. 8). The flap closure mechanism 27 is positionally situated, on the flap and connects to the front piece. It functions to both 1) secure the external device inside the pouch 1 and also to 2) if the pouch 1 is rolled up, may keep it rolled up. Some embodiments may use a zipper 29, a button 30, a clasp 31, velcro 32, a snap 33, a tied string 34, ziploc 35, adhesive 36, tape 37, a tack 38, a magnetic clasp 39, or a string and cinch 40 as the flap closure mechanism 27.

In the main embodiment, the flap aperture 7 FIG. 7 is found perpendicular to the access aperture 9 and is what the flap region covers when operated. The flap aperture 7 is designed to 1) have a way to put something in the pouch, 2) a means for device access without encountering hanging support 2, and 3) an alternative means to remove or insert the device, rather than the access aperture. While generally thought to mimic the width of the front and back piece, the flap aperture 7 may be as small as ⅞ of the back piece width (for example, if the flap aperture does not extend to the access aperture). Further, the flap aperture 7 may not be required in some embodiments as there could only be the access aperture 9 for inserting and removing one or more peripheral device(s).

Opposite the back piece, and forming the other half of the pouch (and flap aperture) is the the front piece 5. It has several important features including; an aperture closure mechanism 6, a front outside surface 41, an access aperture front edge 42, and a top flap edge 43. In general, the front piece should match the dimensions of the back piece. Thus the front piece 5 should have a height of 8 inches, but in some cases it is thought that the height may range from a smallest value of 2 inches (or 20% of the size of the back piece) to a largest value of 36 inches (or 100% of the size of the back piece). Further, the front piece 5 width would preferably be approximately 8 inches, but may also range from a smallest width of 4 inches to a maximum width of 36 inches.

Once the back and front pieces are combined, there is an access aperture created, that is perpendicular to the flap aperture (FIG. 7). The access aperture 9 is designed to 1) have a way to put/remove something in the pouch and 2) allow devices of different sizes and/or their functional connections (cords) to be both secure and accessible. The access aperture 9 length should match the front piece height, and is preferably 8 inches, but in other instances may be as small as 1 inches, (or 10% of the front piece height) to allow one or more cords out) or as large as 36 inches (or matching the height of the front piece). Further, one may reason that if the access aperture 9 is absent, than it is possible that there may be a built in attachment for a cord, or alternatively a docking station.

In order to close the access aperture, preferably there is an aperture closure mechanism 6. The aperture closure mechanism 6 allows one to tighten and secure the device inside, but leave enough space for functional connections to be operable and allow airflow. In an alternative embodiment, there may be a series of closure mechanisms 6 that allow one to adjust the points of attachment between the front piece 5 and back piece 4, so that devices of different sizes and/or functional connection positions can be both secure and accessible. Preferably, the aperture closure mechanism 6 comprises two items, the back piece aperture closure mechanism portion 44 and the front piece portion closure mechanism 45, which are just two operable components of most closure mechanisms. For example, in some versions of the invention, functionally, the aperture closure mechanism 6 could be either a zipper 46, a button 47, a clasp 48, a velcro 49, a snap 50, a tied string 51, a ziploc 52, a adhesive 53, a tape 54, a tack 55, or a magnet clasp 56.

Opposite the access aperture is a sealed edge 8. It is a back stop or closed edge to support the device. However, one can contemplate that if the sealed edge 8 is not included than there may be multiple access aperture 9 that are adjustable, along various edges of the front and back pieces. Further, in other embodiments, there may be a zipper that goes along all edges and can adjustably seal the pouch, with access points for functional connections.

Figure 4:
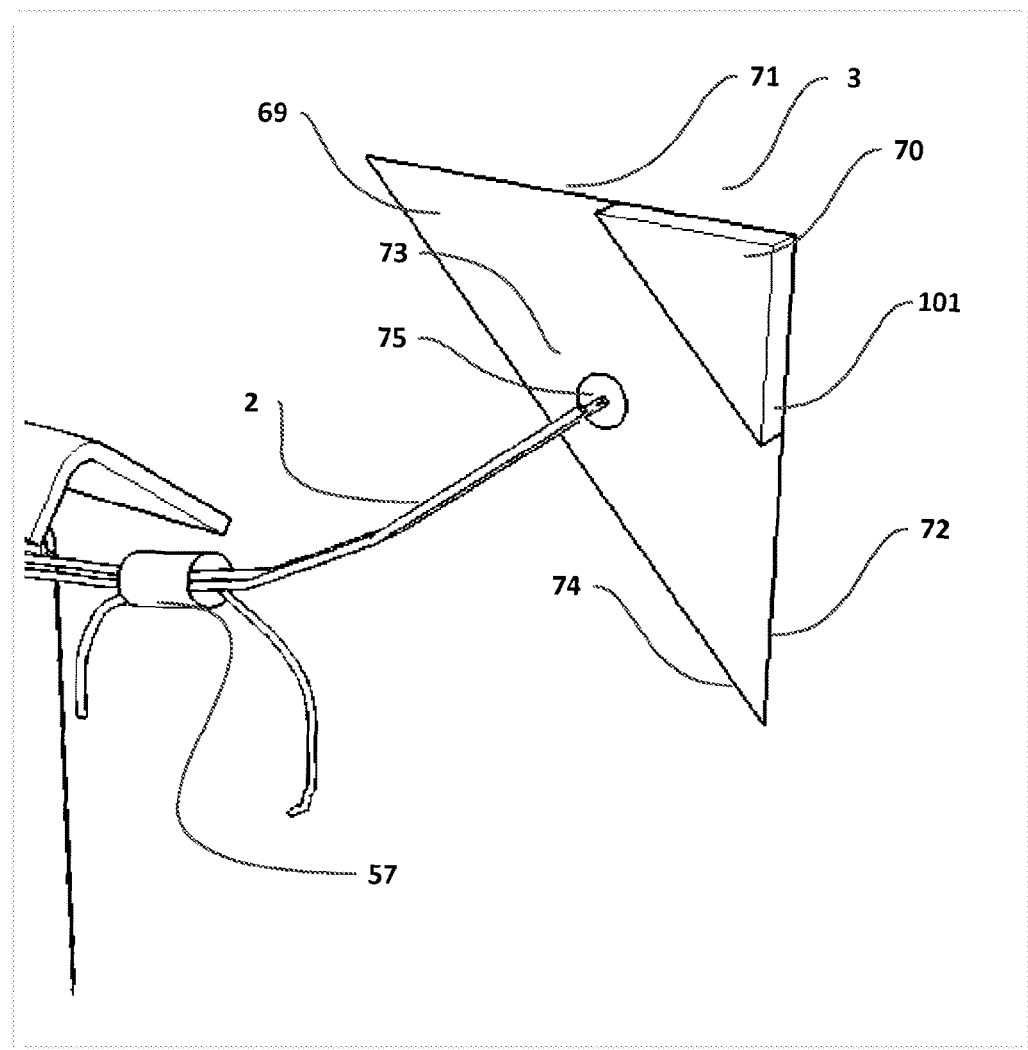
FIG. 4 is a perspective view that shows corner piece and its attachment to a tension mechanism.
Figure 5:
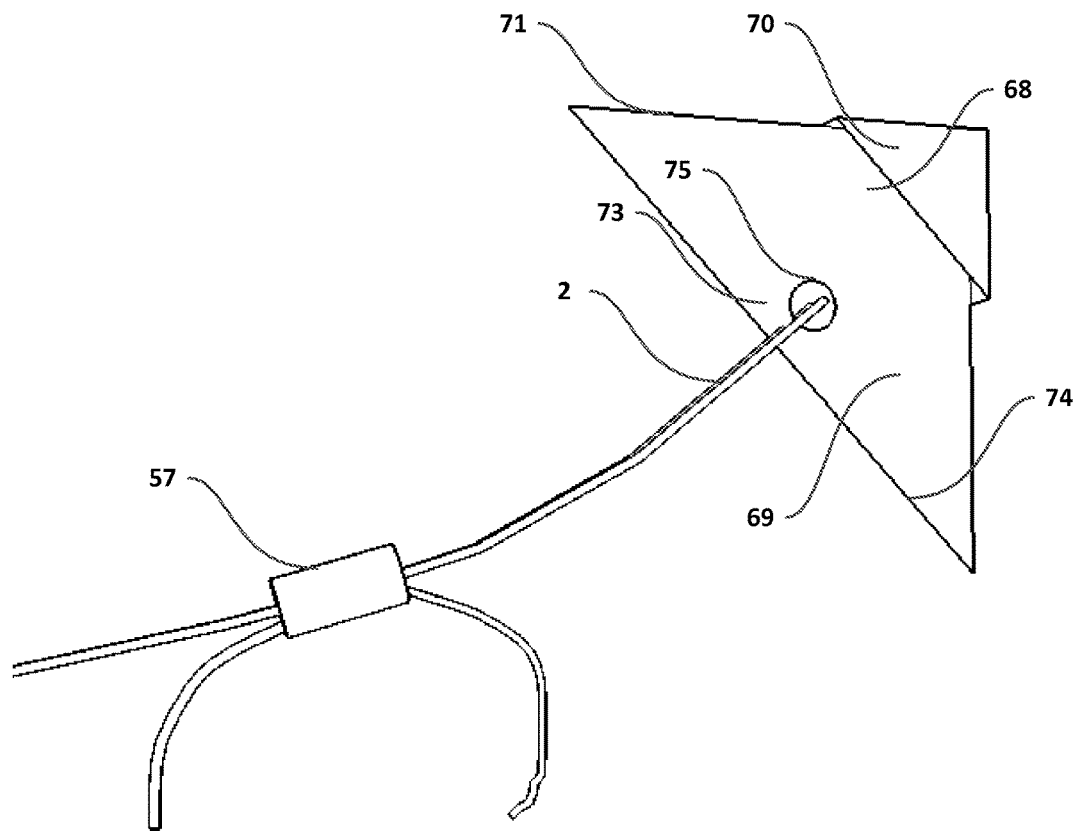
FIG. 5 is a perspective view that shows the a tension mechanism used to vary the operable length of the hanging support.
Figure 6:
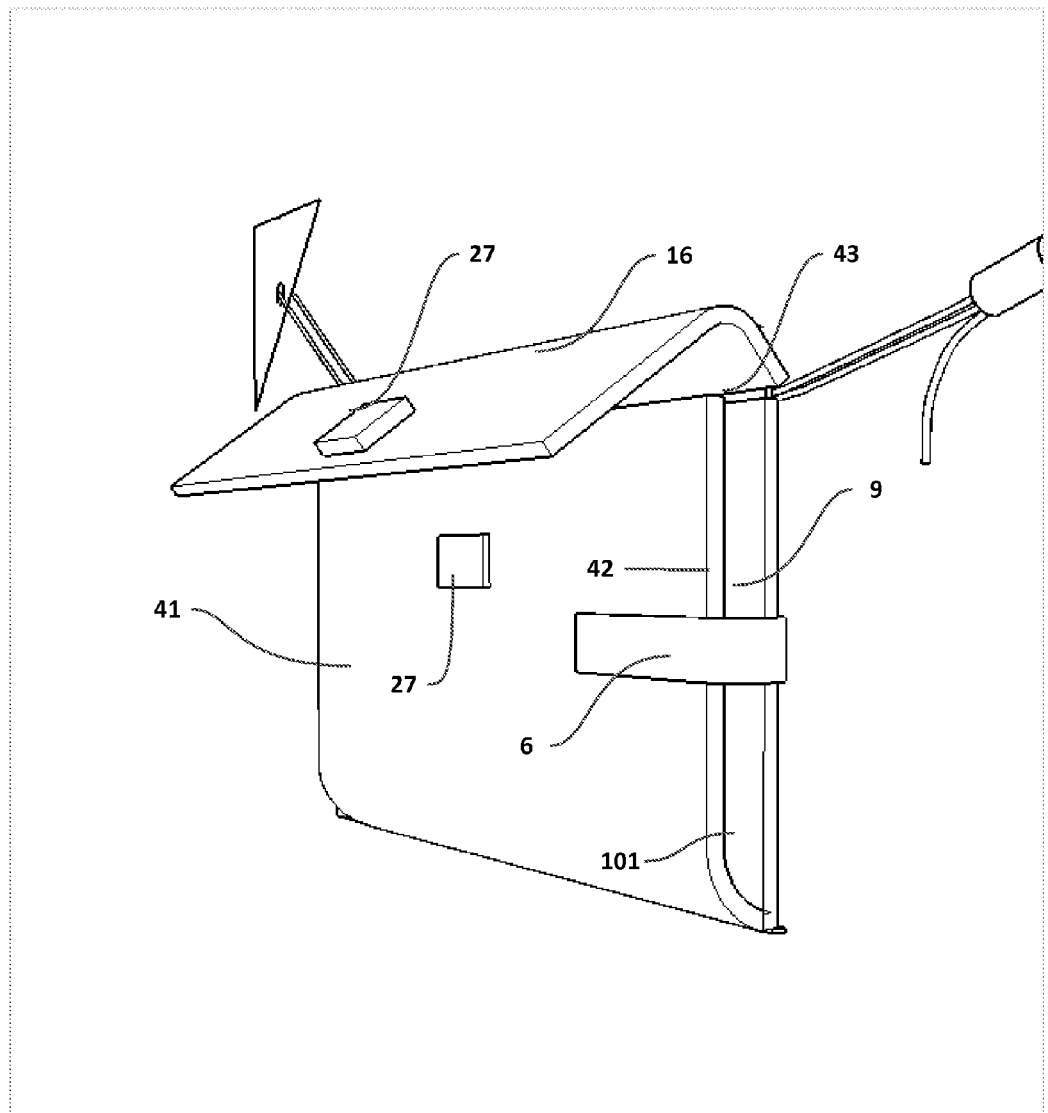
FIG. 6 is a perspective view that shows the side opening of the apparatus along with the two clasps; one on top and one on the side.

In order to support the pouch, the pouch is removably attached to the computer via one or more hanging supports FIG. 4, 5. These hanging supports, in turn comprise a tension mechanism, which allows one to alter the tension of the supports so that the pouch may be stable and securely affixed to the computer. There are several aims of the hanging support; First, it functions to hold the pouch flat against the back of the monitor if desired. Additionally, the hanging support 2 is designed to suspend the pouch 1 away from the computer, if desired, based on tension. Further, the hanging support 2 allows a person to securely move the device without having the pouch 1 contents fall or get lost.

In some versions of the invention, functionally, the hanging support 2 could be either a stretchable fabric 58, a stretchable plastic 59, a stretchable rubber 60, a belt with notches 61, a string in a loop 62, or a velcro 63. Further, it is contemplated that in other embodiments of the invention the tension mechanism 57 may be a cinch 64, a belt notches 65, a buckle 66, or a buckle rings 67. Further, in some embodiments, the tension mechanism 57 may be a rigid hanging support 2, useful if one desires specific dimensions.

In order to attach to the hanging supports to the computer, the hanging supports connect to one or more corner pieces 3 FIG. 4,5,9. They provide an anchor for the tension induced by the hanging support 2 and pouch 1 and grip the corner of the monitor, so it does not slide off. In some embodiments, there may be up to 4 corner pieces, for all four corners of the monitor.

In turn, the corner pieces preferably comprise, a corner aperture 68, a back flap 69, a front flap 70, a top edge 71 (width: preferred—1", min—0.25", max—2"), and a side edge 72 (width: preferred—1", min—0.25", max—2"). In the preferred embodiment, the corner piece 3 made up of rubber, but in some cases the corner piece 3 may also be made of leather, plastic, hard plastic, velvet, cloth, denim, pliable material, durable paper, grippable, soft material, knit, woven lattice, or parafilm. It is preferably triangular in shape however may be shaped like a cut triangle, ring with back flap, bunny ears, animal ears, eyeballs or another novelty design desired by the users. In some alternative embodiments, one can contemplate that if the corner piece 3 is missing than stretchable nylon fabric may surround the monitor or alternatively, that a permanent attachment to the monitor may bind to the hanging support 2.

The corner of the computer inserts into the corner aperture 68 of the corner piece. In the preferred embodiment, the corner aperture 68 width is approximately 1 inches, but may range from 0.25 inches to a maximum width of 2 inches (such as not to impede the screen).

Partially forming the corner aperture, the back flap 69 preferably comprises a hanging support attachment region 73 and a transverse edge 74. The back flap 69 is the means by which the corner piece attaches to the hanging support 2. It is preferably triangular in shape however may be pointed, tab-shaped, circular, semi-circular or box-shaped. This is by means of a hanging support corner attachment 75 within a hanging support attachment region 73 (positioned in the midline of the corner piece 3 and close to the transverse edge 74). In some embodiments of the invention the hanging support corner attachment 75 may be a series of holes 76, a button 77, a clip 78, a clasp 79, a hook 80, a loop 81, a grommet 82, a buckle 83, a sliding rail 84, or a knot 85.

Also forming the corner aperture, the front flap covers part of the front of the monitor, but not the screen. It is thought that in the preferred embodiment, the front flap 70 width would preferably be 1 inches, but may range from 0.25 inches to a maximum width of 2 inches.

The invention comprises numerous terms that are necessary to define the scope of for purposes of interpretation. The definition of these terms below allows numerous embodiments of the invention that may arise, rather than just the preferred embodiment as described above.

The term hanging support connection 12 may include a means to suspend the pouch and accommodate changes in the hanging support 2 allowing use of the invention for different size external devices and computers. The term hanging support connection inside length 13 is broadly thought to include the interior distance between the hanging support connections 12.

The term hanging support connection outside length 14 is broadly thought to include distance between the hanging support connection 12 and the access aperture front edge 42 and/or the sealed edge 8. The term hanging support connection top length 15 is thought to encompass distance between the hanging support connection 12 and the top flap edge 43. The term hanging support 2 is thought to encompass a means for connecting the corner piece 3 and the pouch 1, which has the ability to adjust tension in order to suspend the pouch.

The term back flap 69 is broadly thought to include a portion of the corner piece 3 that forms the corner aperture 68 and has one or more regions to attach to hanging support 2. The term front flap 70 may include a portion of the corner piece that forms the corner aperture 68 that has enough area to secure the invention to the monitor, but does not impede viewing of the screen. The term top edge 71 may include a portion of the corner piece that is formed from at the top boundary of the front and back flap. The term side edge 72 may include a portion of the corner piece that is formed from at the side boundary of the front and back flap.

What is claimed is:

1. An apparatus for computer peripheral storage comprising:
   a. a pouch wherein the pouch comprises a back piece and a front piece joined at the periphery to said back piece with at least two unsealed edges, said edges delineating an access aperture and a flap aperture, the boundaries of said flap aperture are operatively connected to a flap closing mechanism, the boundaries of said access aperture are operatively connected to an aperture closing means;
   b. a plurality of corner pieces, said corner pieces comprising a back flap connected to a front flap at the edge forming a side edge, a top edge and a corner aperture, said corner aperture having a width ranging from 0.25 inches to a maximum of two inches;
   c. a plurality of hanging support members having at least two ends, where one end of each hanging support mechanism is joined to one of the corner pieces while the end of the hanging support mechanism not connected to the corner piece is connected to the pouch, in which each corner piece is connected to at least one hanging support member.

2. The apparatus of claim 1 wherein the hanging support mechanism is further comprised of a tension mechanism, said tension mechanism being adjustable in length, said hanging support mechanism being joined to the back flap of the corner piece via a hanging support attachment region, said attachment region being positioned midline of the back flap on the transverse edge of the back flap.

* * * * *